United States Patent [19]

Murakami

[11] Patent Number: 5,336,132
[45] Date of Patent: Aug. 9, 1994

[54] MULTISENSATION CREATION APPARATUS EMPLOYING STEREOSCOPIC IMAGERY

[76] Inventor: Kanji Murakami, 7-1-12-102, Minamiaoyama, Minato-ku, Tokyo, Japan

[21] Appl. No.: 999,152

[22] Filed: Dec. 31, 1992

[30] Foreign Application Priority Data

Apr. 7, 1992 [JP]  Japan .................... 4-085244

[51] Int. Cl.⁵ .............................. A63G 31/16
[52] U.S. Cl. ......................... 472/59; 472/60; 104/78; 104/83; 104/85
[58] Field of Search ............ 472/43, 59, 60, 61, 472/64, 117; 104/78, 83, 84, 86, 85, 69, 70; 246/418, 431, 415 R

[56] References Cited

U.S. PATENT DOCUMENTS

| | | | |
|---|---|---|---|
| 1,192,758 | 7/1916 | Davis | 246/417 |
| 3,404,635 | 10/1968 | Bacon et al. | 104/70 |
| 4,798,376 | 1/1989 | Trumbull et al. | 472/60 |
| 4,920,890 | 5/1990 | Barber | 104/83 |

FOREIGN PATENT DOCUMENTS

| | | |
|---|---|---|
| 0235496 | 9/1987 | European Pat. Off. . |
| 0360334 | 3/1990 | European Pat. Off. . |
| 2041563 | 9/1980 | United Kingdom . |
| 2103944 | 3/1983 | United Kingdom . |

*Primary Examiner*—Carl D. Friedman
*Assistant Examiner*—Kien Nguyen
*Attorney, Agent, or Firm*—Jacobson, Price, Holman & Stern

[57] ABSTRACT

A ship, in which stereoscopic imagery is displayed, can move, and the ship can swing in various directions and can vibrate. The ship moves along a guide path while the stereoscopic imagery is being viewed by inside viewers. The guide path includes a plurality of diverging guide paths midway along the guide path. The ship can freely select one of the diverging paths in accordance with the contents and running time of imagery. The ship, which has passed the diverging guide path, passes through a confluence portion and returns to the start position. Thereby, multisensation can be created, and an effective sensation atmosphere can be created on the basis of visual and other senses, with a small space for installation and low costs.

11 Claims, 10 Drawing Sheets

MULTISENSATION CREATION APPARATUS EMPLOYING STEREOSCOPIC IMAGERY

BACKGROUND OF THE INVENTION

1. Field of the Invention

The present invention relates to a multisensation creation apparatus employing stereoscopic imagery, which can create a multisensational atmosphere by using a stereoscopic imagery projection system, and can realize various equipment, multisensory learning equipment, and multisensation leisure equipment.

2. Description of the Related Art

In conventional sensation leisure equipment (e.g. a roller coaster, a carousel, etc.), once hardware is constituted, only one kind of sensation can be created. In order to obtain another kind of sensation, it is necessary to reconstruct the hardware at high cost. In addition, conventional equipment requires enormous costs and space for installation.

SUMMARY OF THE INVENTION

The object of the present invention is to provide a multisensation creation apparatus employing stereoscopic imagery, wherein even if one kind of hardware is used, various sensations can be created by using various software, and an effective sensation atmosphere can be created on the basis of visual and other senses, with a small space for installation and low costs.

According to this invention, there is provided a multisensation creation apparatus employing stereoscopic imagery, comprising:

a vehicle having an entrance door and stereoscopic image reproducing means therein;

guide path means for guiding the vehicle from a first point to a second point, said guide path means including diverging guide paths and confluence ("converging") guide paths; and guide path selecting means for selecting one diverging guide path for the vehicle from the guide paths, in accordance with the contents of imagery displayed by the stereoscopic image reproducing means.

The guide path selecting means can select the guide path of a vehicle, which is most suitable for creating sensations associated with the contents of the imagery displayed in the vehicle. The viewer in the vehicle has a visual atmosphere created by stereoscopic imagery, and therefore an effective sensation atmosphere based on other senses can be created by slight physical vibration and inclination. Thus, the speed of the vehicle may be slow. As a result, the space for installing the apparatus may be small, and the costs can be reduced.

The term "ship" may be used, for purposed of the description of the invention, interchangeably with the term "vehicle".

DETAILED DESCRIPTION OF THE PREFERRED EMBODIMENT

An embodiment of the present invention will now be described with reference to the accompanying drawings.

FIG. 1 shows a structure of a ship 100 according to an embodiment of the invention. FIG. 1A is a top view, FIG. 1B is a side view, FIG. 1C is a bottom view, and FIG. 1D is a view showing a sensation creating mechanism of a wheel provided in the ship.

Figure 1A:
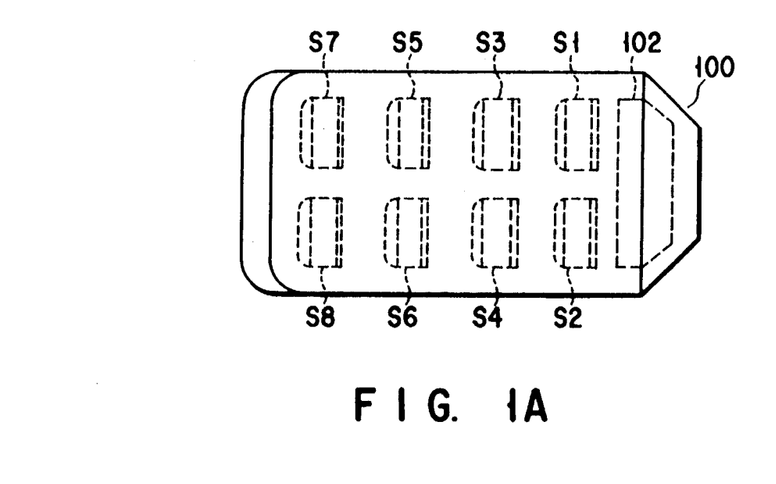
FIGS. 1A to 1D how a structure of a ship according to an embodiment of the present invention.
Figure 1B:
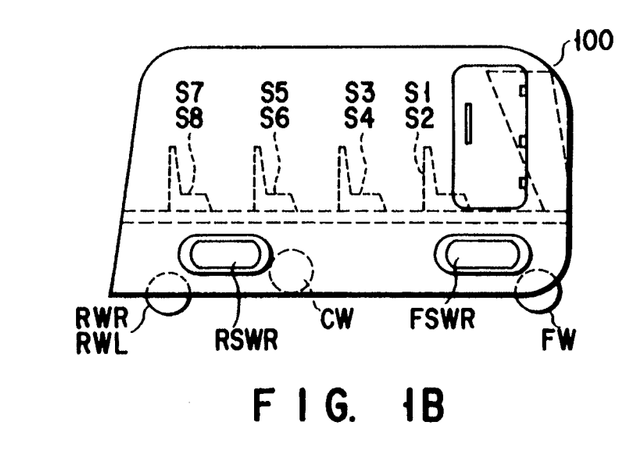
Figure 1C:
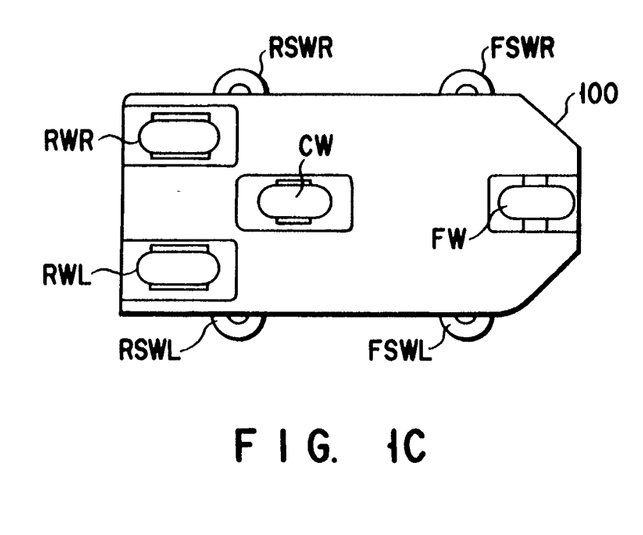

A stereoscopic imagery projecting unit 102 is situated at a front area of the inside of the ship 100. Viewers can sit on seats S1 to S8. A door 103 is provided on a side portion of the ship 100. The ship 100 has wheels on its bottom. A front wheel FW is situated at the center of the front part of the ship 100. A rear left wheel RWL and a rear right wheel RWR are situated on the left and right sides of the rear part of the ship 100. A center wheel CW is situated at the center of the rear part of the ship 100. In addition, a front left side wheel FSWL and a front right side wheel FSWR are situated on the front side parts of the ship 100, and a rear left side wheel RSWL and a rear right side wheel RSWR are situated on the rear side parts of the ship 100. The axes of the wheels FW, RWL, RWR and CW are horizontal, while the axes of the wheels FSWL, FSWR, RSWL and RSWR are vertical.

Accordingly, the wheels FW, RWL and RWR rotate when the ship 100 moves forward on the path. A driving power can be transmitted from a driving motor (not shown) to the rear wheels RWL and RWR of the ship 100. The center wheel CW is normally placed within the ship 100, as shown in FIG. 1B. However, in a special sensational atmosphere is created, the wheel CW is lowered into contact with the path, as will be described later. When the special sensational atmosphere is created, each wheel is projected from the body of the ship 100.

Figure 1D:
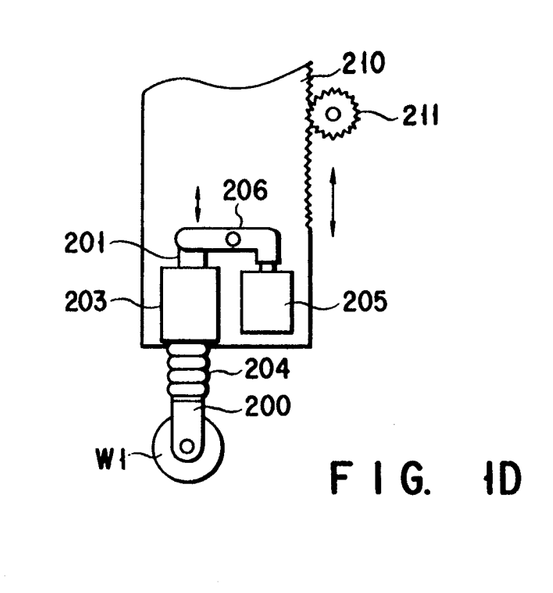

FIG. 1D shows a wheel attitude control mechanism. A wheel W1 is rotatably attached at one end of each of support plates 200 for supporting both sides of a wheel shaft. The other end of each support plate 200 is formed integral with a rod 201, thereby constituting a hydraulic pump 203. A portion of the rod 201, which is close to the wheel W1, is provided with a coil spring 204 for absorbing vibration from the wheel W1. A head of the rod 201 is put in contact with an arm 206 of an electromagnetic vibrator 205. When the electromagnetic vibrator 205 is turned on, vibration is transmitted to the rod 201 in its axial direction. The bodies of hydraulic pump 203 and electromagnetic vibrator 205 are fixed on a slide holder 210. In accordance with forward or reverse rotation of a motor 211, the entire wheel mechanism can be moved along the axis of the rod 201. More specifically, by controlling the motor 211, the wheel W1 can be projected from, or retreated in, the ship 100.

The slide holder 210 and motor 211 are fixed to the main chassis of the ship 100. Although FIG. 1D shows one wheel as a representative example, each wheel provided on the ship 100 can be controlled independently.

Though not shown, the top of the ship 100 is openable like a "cabriolet" car. The openable top is opened when a sensational atmosphere is to be created within the ship by means of external factors such as cool wind, hot wind, light, etc.

Figures 2A, 2B:
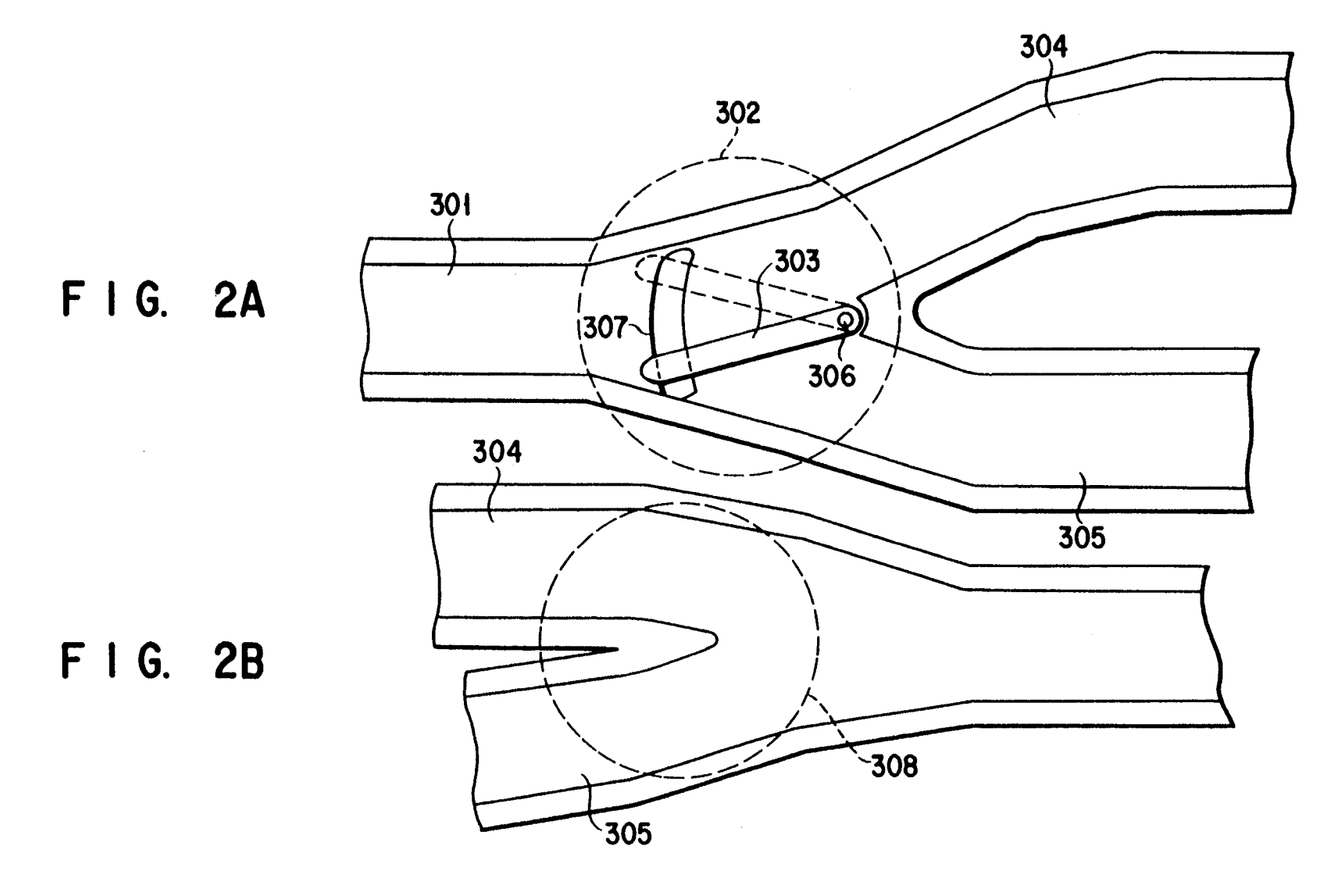
FIGS. 2A and 2B show a structure of a guide path according to the embodiment of the invention.

FIG. 2 shows part of a guide path on which the ship 100 moves. The guide path used in the present system has a diverging portion and a confluence portion through which the ship 100 passes. FIG. 2A shows an example of a diverging portion 302. The guide path has a groove of a substantially U-shaped cross section (see FIG. 4), and the ship 10 moves along the U-groove. When the ship 100 coming from a common guide path portion 301 has reached the vicinity of a diverging path 302, a partition wall 303 is controlled to guide the ship 100 to a first guide path 304 or a second guide path 305. The partition wall 303 is attached at the diverging portion 302 by a shaft 306 so that the wall 303 can be horizontally rotated. A guide slit 307 for guiding a tip end portion of the partition wall 303 is formed in a bottom part of the diverging portion 302, and the wall 303 can be swung between a position indicated by a dotted line and a position indicated by a solid line. When the diverging wall 303 is located at the position indicated by the solid line, the ship 100 is guided from the common guide path 301 to the first guide path 304. When the wall 303 is located at the position indicated by the dotted line, the ship 100 is guided from the common guide path 301 to the second guide path 305. The partition wall 303 is automatically controlled by a switching mechanism when the ship 100 approaches the diverging portion 302. The specific means for controlling the partition wall 303 will be described later with reference to FIG. 6. FIG. 2B shows a confluence portion 308. The ship 100 coming from the first guide path 304 or second guide path 305 can go to a common guide path 309 via the confluence portion 308.

According to the guide path equipment described above, each part of the guide path is formed as a unit, and various shapes of guide path can be obtained by combining the units. The guide path can be increased or decreased by using concrete guide path units or iron guide path units, in accordance with the space for installation. In addition, the structure of the guide path can be modified variously. For example, techniques of a suspended-type monorail can be utilized.

Figure 3:
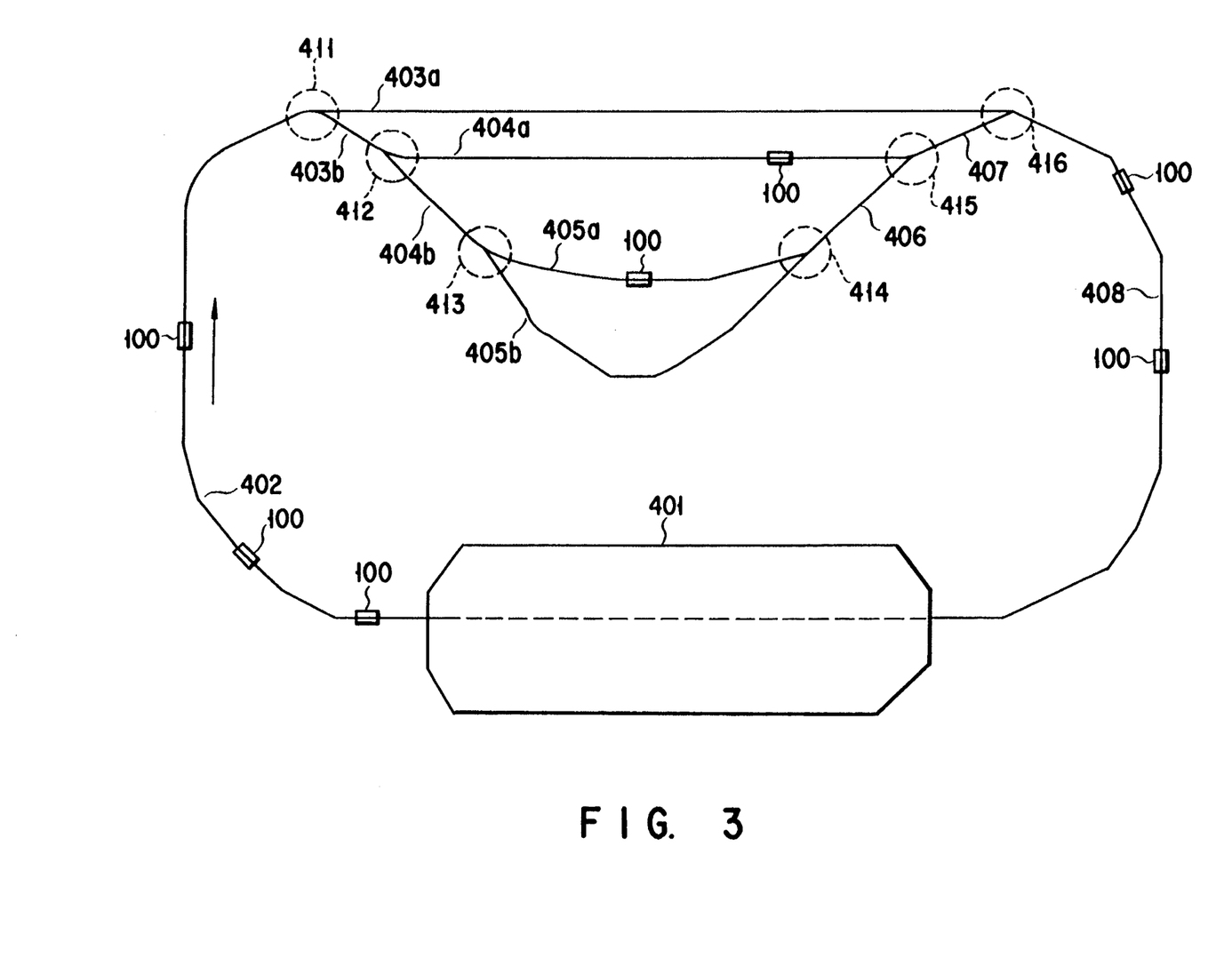
FIG. 3 shows entire sensation creation equipment according to the embodiment of the invention.

FIG. 3 shows an example of the entire guide path system. The ship 100 starts from a port 401 and travels on a common guide path 402. The ship 100 is guided to a guide path 403a or 403b via a diverging portion 411. When the ship 100 approaches a diverging portion 412 via the guide path 403b, it will then be guided to a guide path 404a or 404b via the diverging portion 412. When the ship 100 approaches a diverging portion 413 via the guide path 404b, it will then be guided to a guide path 405a or 405b. Ships coming from the guide paths 405a and 405b can join at a confluence portion 414. Ships coming from the guide paths 407 and 403a can join at a confluence portion 416. The last common guide path 480 is lead to the port 401 and connected to the guide path 402 of the starting section.

As described above, the route for the ship 100 can be selected from various paths. The ship can be controlled on various paths for creating various sensations. Ships can be started successively at intervals of 5 m or 10 m. In addition, the movement of each ship can be controlled wirelessly by a central control center.

Figure 4:
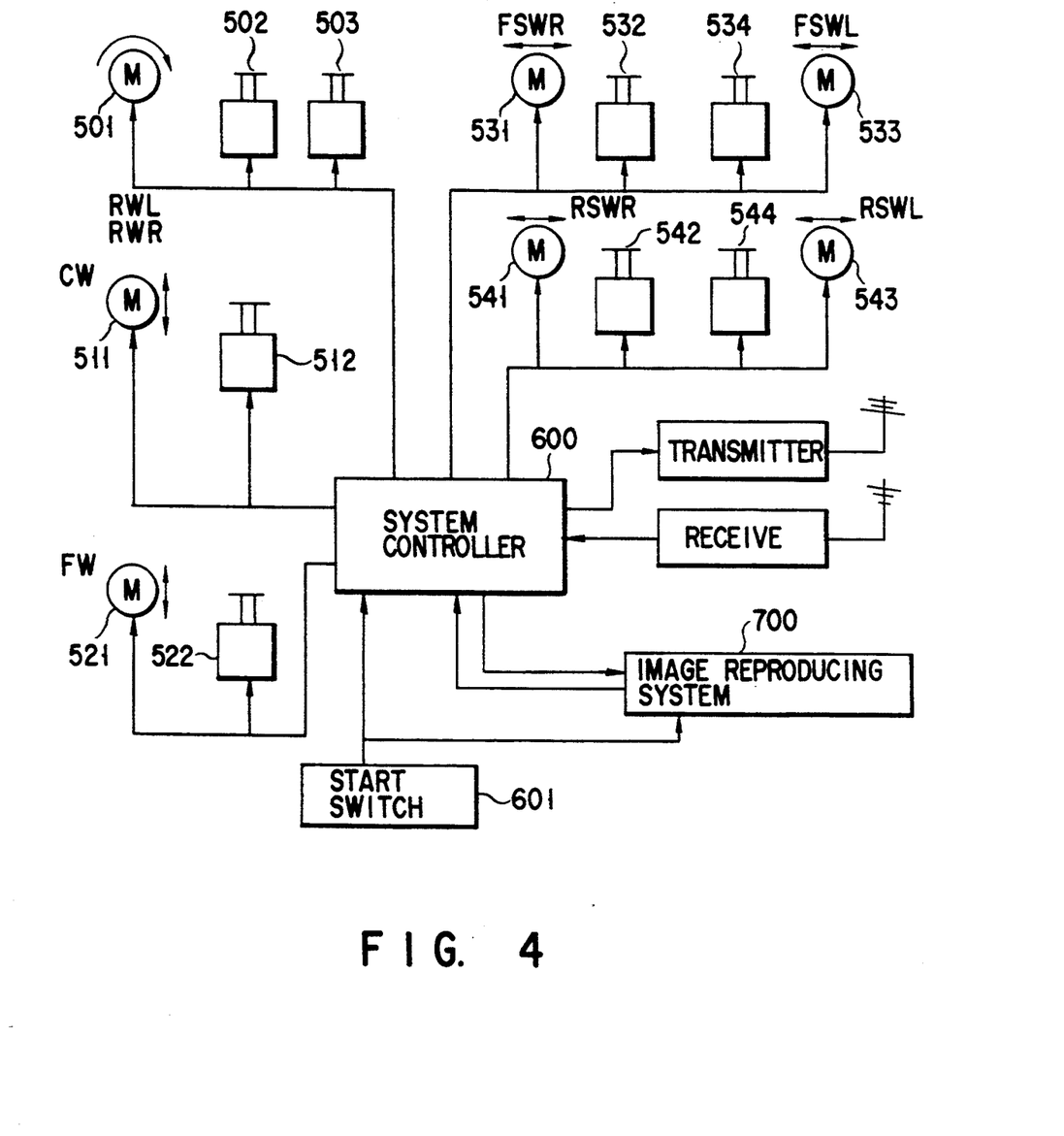
FIG. 4 shows control equipment mounted in the ship shown in FIG. 1.

FIG. 4 shows an example of multisensation creation equipment mounted in one ship. A motor 501 drives the rear left wheel RWL and rear right wheel RWR. Electromagnetic vibrators 502 and 503 vibrate the wheels vertically. An electromagnetic vibrator 512 vibrates the center wheel CW vertically. A motor 521 moves the front wheel FW vertically, and an electromagnetic vibrator 522 vibrates the front wheel FW vertically. A motor 531 is used to project/retreat the front right side wheel FSWR from/into the body, and an electromagnetic vibrator 532 vibrates the wheel FSWR horizontally. A motor 533 is used to project/retreat the front left side wheel FSWL from/into the body, and an electromagnetic vibrator 534 vibrates the wheel FSWL horizontally. A motor 541 is used to project/retreat the rear right side wheel RSWR from/into the body, and an electromagnetic vibrator 542 vibrates the wheel RSWR horizontally. A motor 543 is used to project/retreat the rear left side wheel FSWL from/into the body, and an electromagnetic vibrator 544 vibrates the wheel RSWR horizontally.

These motors and electromagnetic vibrators are controlled by a system controller 600 in accordance with a program or control data coming from an image reproducing system 700. The system controller 600 is operated by a start switch 601, thereby activating the image reproducing system 700 and starting the control of the entire system.

FIG. 5 shows typical attitudes of the ship 100 controlled by the above-described multisensation creation equipment. FIGS. 5A to 5C are rear views, and a FIG. 5D is a side view.

Figure 5A:
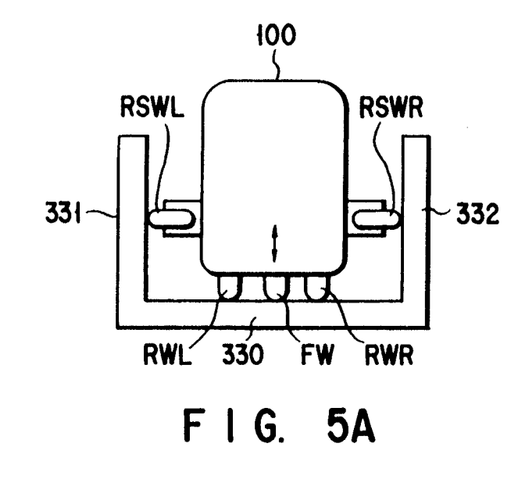
FIGS. 5A to 5D are views for illustrating the operation of the ship of FIG. 1.

FIG. 5A shows the attitude of the ship 100 while it runs normally. The front wheel FW, rear left wheel RWL and rear right wheel RWR are put in contact with the bottom wall of the guide path, and each side wheel is put in contact with the side walls 331 and 332. In this state, when the electromagnetic vibrators 522, 502 and 503 (see FIG. 4) for the wheels FW, RWL and RWR, the ship 100 can be vibrated vertically. (The vertical vibration is suitable, e.g. when the internal stereoscopic imagery system displays a scene in which a vehicle runs on a rough road.)

Figure 5B:
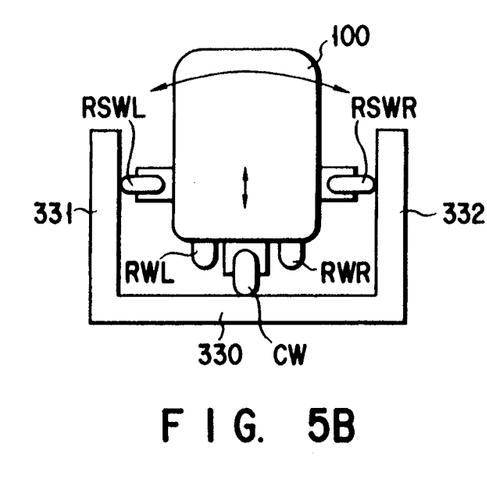

FIG. 5B shows the state in which the center wheel CW and front wheel FW project from the body so that the ship 100 is elevated. By the elevation of the ship 100, an effective sensation is created, e.g. when the internal stereoscopic imagery system displays a scene in which an airplane climbs. For example, when the imagery system displays a scene in which a ship sails, the ship 100 is slowly raised and lowered repeatedly, which increases sensational effect.

Figure 5C:
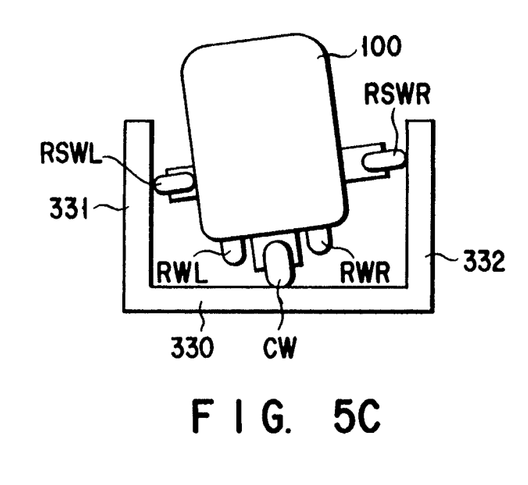

FIG. 5C shows the state in which the ship 100 is raised by the center wheel CW and front wheel FW, and the front and rear right side wheels FSWL and RSWL project from the body, and the front and rear left side wheels FSWL and RSWL retreat, so that the ship 100 is inclined to the left. For example, when the stereoscopic imagery system displays a scene in which an airplane turns, multisensational effect is created in addition to visual effect.

Figure 5D:
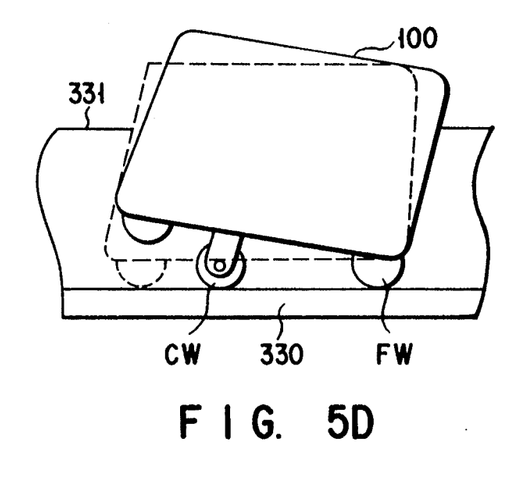

FIG. 5D shows the state in which only the center wheel CW is projected from the body. In this state, the viewers incline forward. This attitude enhances sensational effect, for example, when the imagery system displays a scene of ski jumping.

As has been described above, the attitude of the ship 100 can be changed variously. For example, when video images of different contents and running times are displayed within two or more ships by the image reproducing system 700, the time at which the ships return to the port 400 can be adjusted by selecting the guide paths suitable for the ships. Referring back to FIG. 3, when the contents of the imagery are suitable for constant-speed driving of the ship 100 (e.g. a scene of a motor race, in which the viewers feel as if they rode on a racing car), the guide path 402, 403a, 408 is selected. The imagery is displayed at high speed, while the ship runs slowly. The viewers can feel considerable visual sensational effect. In addition, if the ship is sometimes vibrated by the electromagnetic vibrators, more sensational effect can be created. Suppose that the internal image reproducing system displays imagery relating to a sight-seeing submarine, and the submarine stops midway, and maritime or submarine scenes are displayed. Such imagery may have a longer running time that the above-mentioned imagery of a racing car. In this case, the guide path 402, 403b, 404a, 407, 408 is selected. The maritime or submarine scenes are programmed to be displayed when the ship is stopped on the guide path 404a.

As has been described above, according to the above system, realistic speed-related sensation can be created by the contents of the imagery displayed within the ship. Other sensations relating to vibration, inclination and swinging of the ship are created by the sensation creation equipment, in addition to the contents of the imagery. Thereby, the viewers can feel more realistic sensations. As a result, sensations can be created by the combination of the stereoscopic imagery and supplemental physical movement, even if actual hardware such as a roller coaster or carousel is not prepared. In addition, air ventilation equipment for feeding cool air or warm air to the viewers may be provided within the ship.

Figure 6:
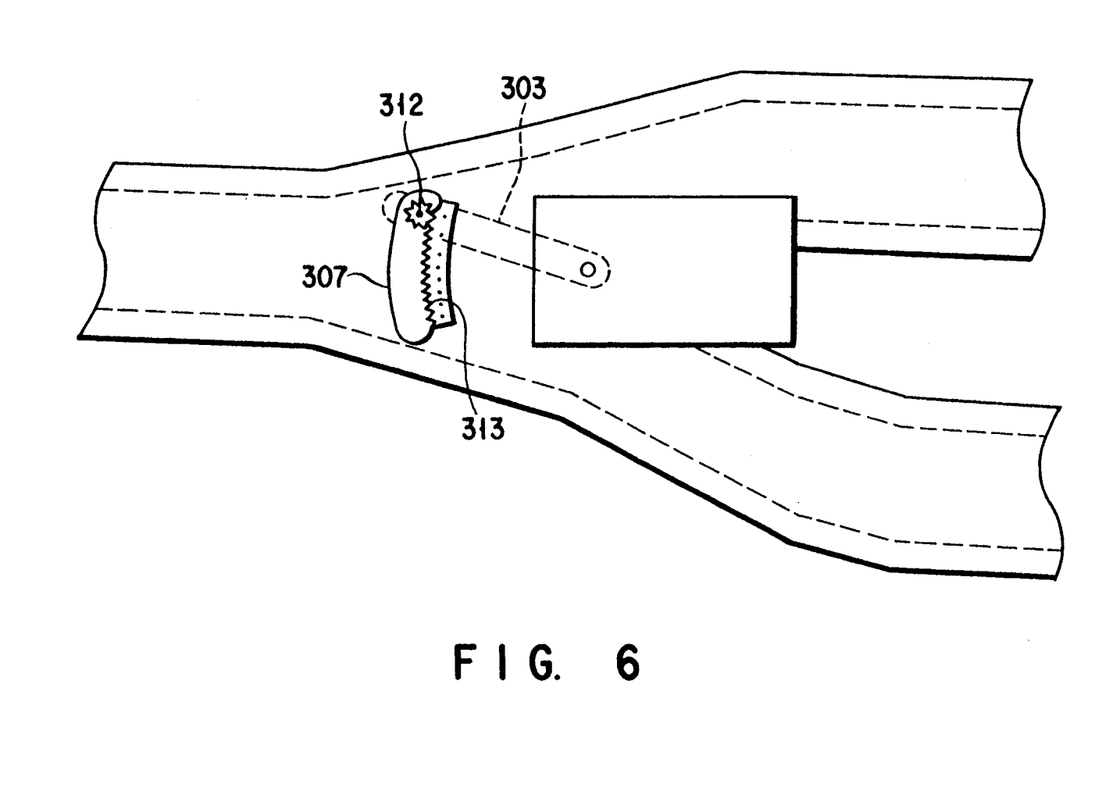
FIG. 6 shows a structure of a diverging portion of the guide path.

FIG. 6 shows a diversion control mechanism for driving a partition wall at a diversion portion of the guide path. The diverging portion 302 shown in FIG. 2A will now be described. FIG. 6 shows the diverging portion 302 of FIG. 2A, as viewed from the bottom side thereof. A motor (not shown) is attached to a lower side portion of a distal end portion of the partition wall 303. The motor 311 projects from the guide slit 307. A gear 312 is provided on a rotational shaft of the motor 311. The gear 312 is meshed with a rack 313 formed along the slit 307. The motor 311 is wirelessly controlled, e.g. by the incoming ship 100.

In this system, when two ships arrive at the confluence portion from the diverged guide paths which lead to the common guide path, one of the two ships goes first to the common guide path according to predetermined priority. The priority system is achieved by the radio controllers provided in the ships.

Figures 7A, 7B:
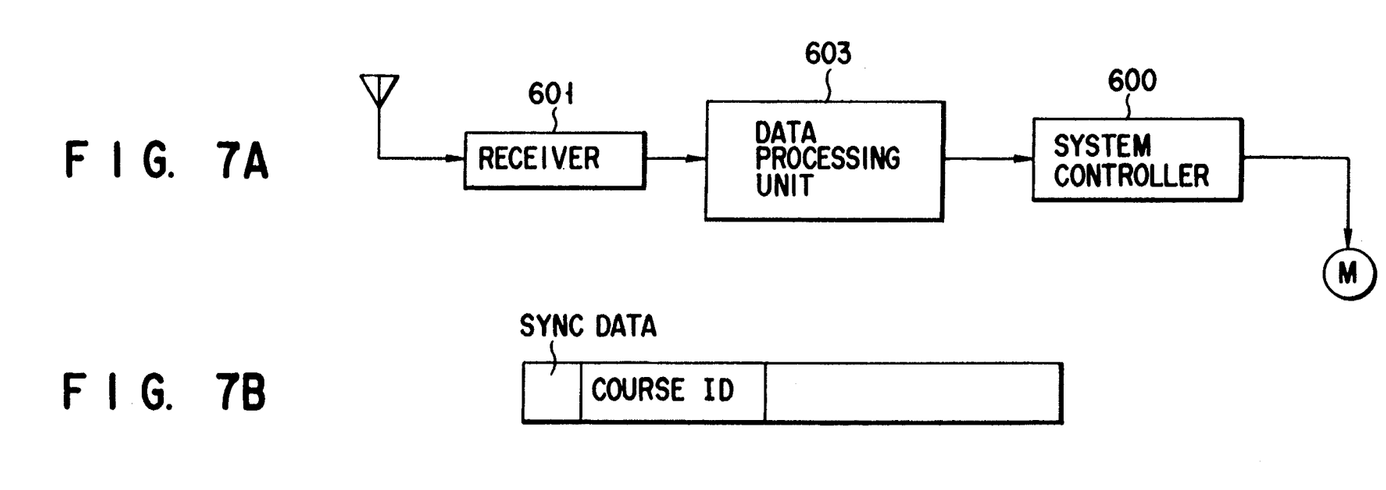
FIGS. 7A to 7C show a radio receiver mounted in the ship of FIG. 1.
Figure 7C:
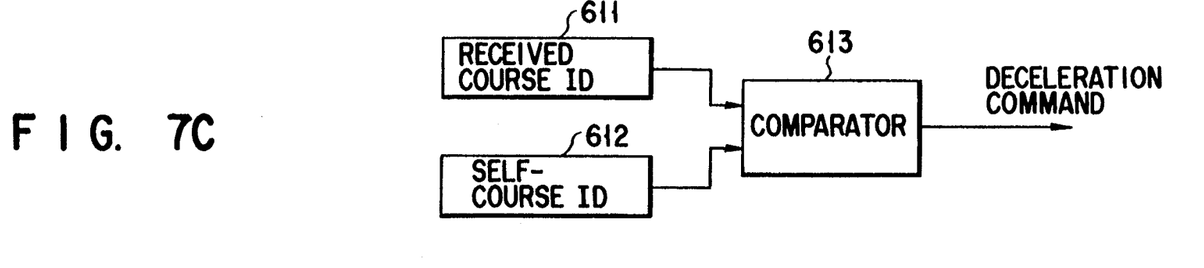

FIG. 7 shows a radio receiver of each ship. Each ship is equipped with a transmitter and a receiver, but FIG. 7 shows only the receiver. A transmission signal of a predetermined frequency is output from each ship. The data carried by the transmission signal is a predetermined self-course ID. The course of a ship is preselected according to the contents of the imagery displayed in this ship.

For example, referring to FIG. 3, a course A comprises guide paths 402, 403a and 408, a course B comprises guide paths 402, 403b, 404a, 407 and 408, a course C comprises guide paths 402, 403b, 404b, 405a, 406, 407 and 408, and a course D comprises guide paths 402, 403b, 404b, 405b, 406, 407 and 408. As shown in FIG. 7A, each ship is equipped with a receiver 601. A signal received and demodulated by the receiver 601 is subjected to data processing in a data processing unit 603. The demodulated signal represents data received from another ship and it includes a course ID, as shown in FIG. 7B. In addition, the demodulated signal includes sync data for data synchronization. In the data processing unit 603, a comparator 613 compares a received course ID 611 and a self-course ID 612, as shown in FIG. 7C. The course IDs are set such that the values of the course IDs increase in alphabetical order. The ship performs the comparison operation at the confluence portion. When a course ID of a lower value is detected, a deceleration command is output from a comparator 613 of the data processing unit 603. The deceleration command is input to the system controller 600 already described with reference to FIG. 4. Then, the system controller 600 decelerates the motor 501 (see FIG. 4) for driving the rear left and right wheels RWL and RWR. Consequently, in the example of FIG. 3, the ship running on the inside course is decelerated, and the ship on the outside course does ahead. Thereby, collision of ships at the confluence portion can be prevented. In addition, radio waves are utilized for communication between ships, and data can be transmitted between the ships approaching the confluence portion.

There are various methods of determining the priority of ships at the confluence portion. For example, when each ship is equipped with optical emission means and optical detection means. For example, when a ship running on an inside course receives an optical signal from another ship running on the outside course, the ship on the inside course is decelerated for a predetermined time period.

In the normal state, when a start command is delivered to a ship from a central control center, the speed of movement of the ship and the internal sensation creation system in the ship are controlled in accordance with a command from the stereoscopic imagery reproducing device. However, the start/stop of the ship may also be controlled by a radio command from the central control center. For example, in an emergency, a stop command can be delivered to the ship from the control system.

Regarding the above embodiment, no special description has given of the sensation creation equipment mounted midway along the diverged paths. In the present system, the guide paths 403a, 404a and 405b may be provided with equipment for externally creating sensations. This aims at enhancing the sensation atmosphere created by the ship, thus giving more realistic sensations to the viewers. Such various equipment may be provided on the respective diverged paths since the entire system is designed to be adaptable to various software.

Figure 8A:
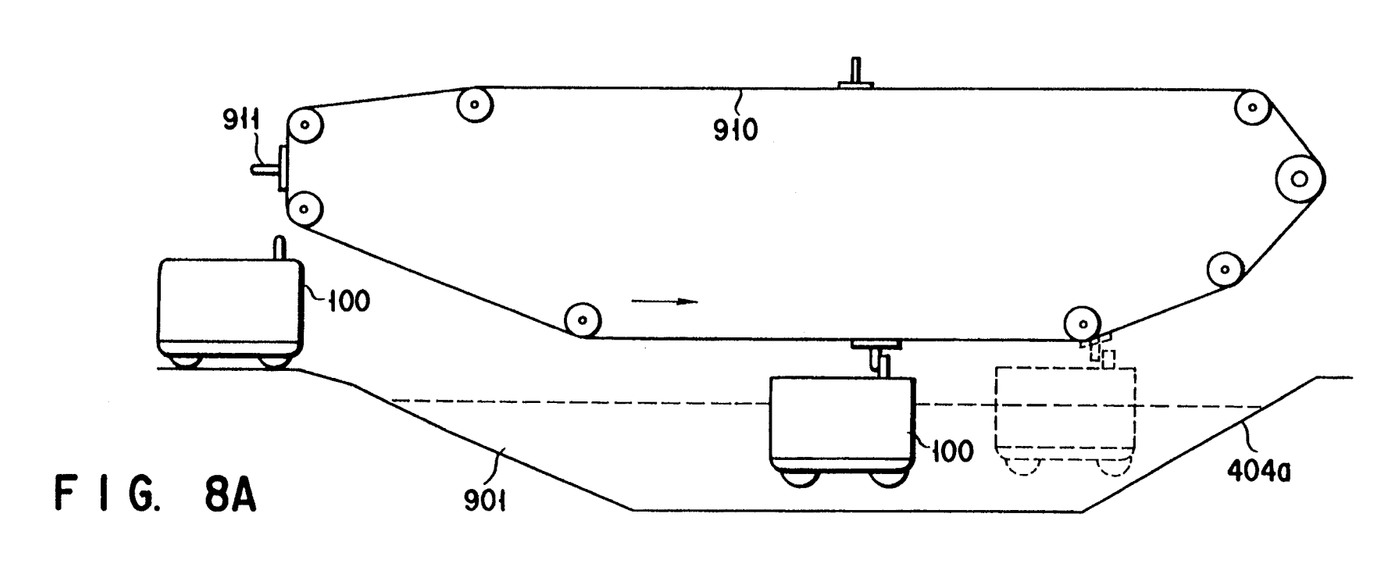
FIGS. 8A and 8B show an example of sensation creation equipment provided midway along the guide path.
Figure 8B:
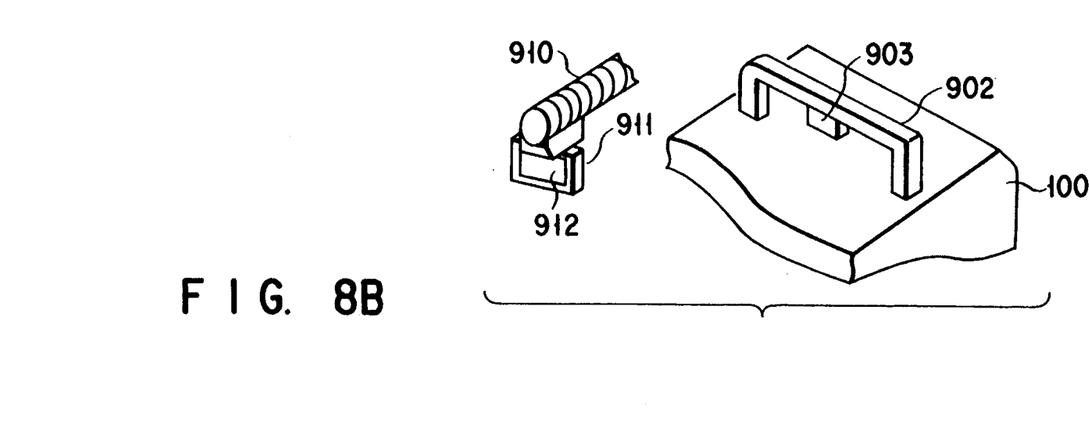

FIG. 8A shows the inside of a dome situated midway along the guide path 404a. A water bath 901 is situated within the dome. The ship 100 can pass through the water bath 901. A handle 902, as shown in FIG. 8B, is attached to the roof of the ship 100. A permanent magnet 903 is provided at a middle of the handle 902. On the other hand, a rope 910 provided within the dome is passed over the water bath 901. The rope 910 is guided by pulleys, and it is passed between the entrance and exit of the water bath 901 (i.e. along the path of the ship 100). An engagement arm 911 is fixed midway along the rope 910. The engagement arm 911 has a permanent magnet 912, as shown in FIG. 8B. When the rope 910 is driven in the direction of an arrow, the engagement arm 911 abuts on the handle 902 of the ship 100 and carries the ship 100. Then, the ship 100 goes into the water bath 901 and advances while it is suspended. When the ship 100 approaches the exit of the water bath 901, the ship 100 lands on the bottom of the guide path 404a and runs on the path. For example, when the internal imagery displaying device displays a scene of an excursion ship, more effective sensation can be created if the ship 100 is floated in the water bath along the guide path 404a. It is also advisable that real fish is put in the water bath so that the viewers can see the fish through glass windows.

Figure 9:
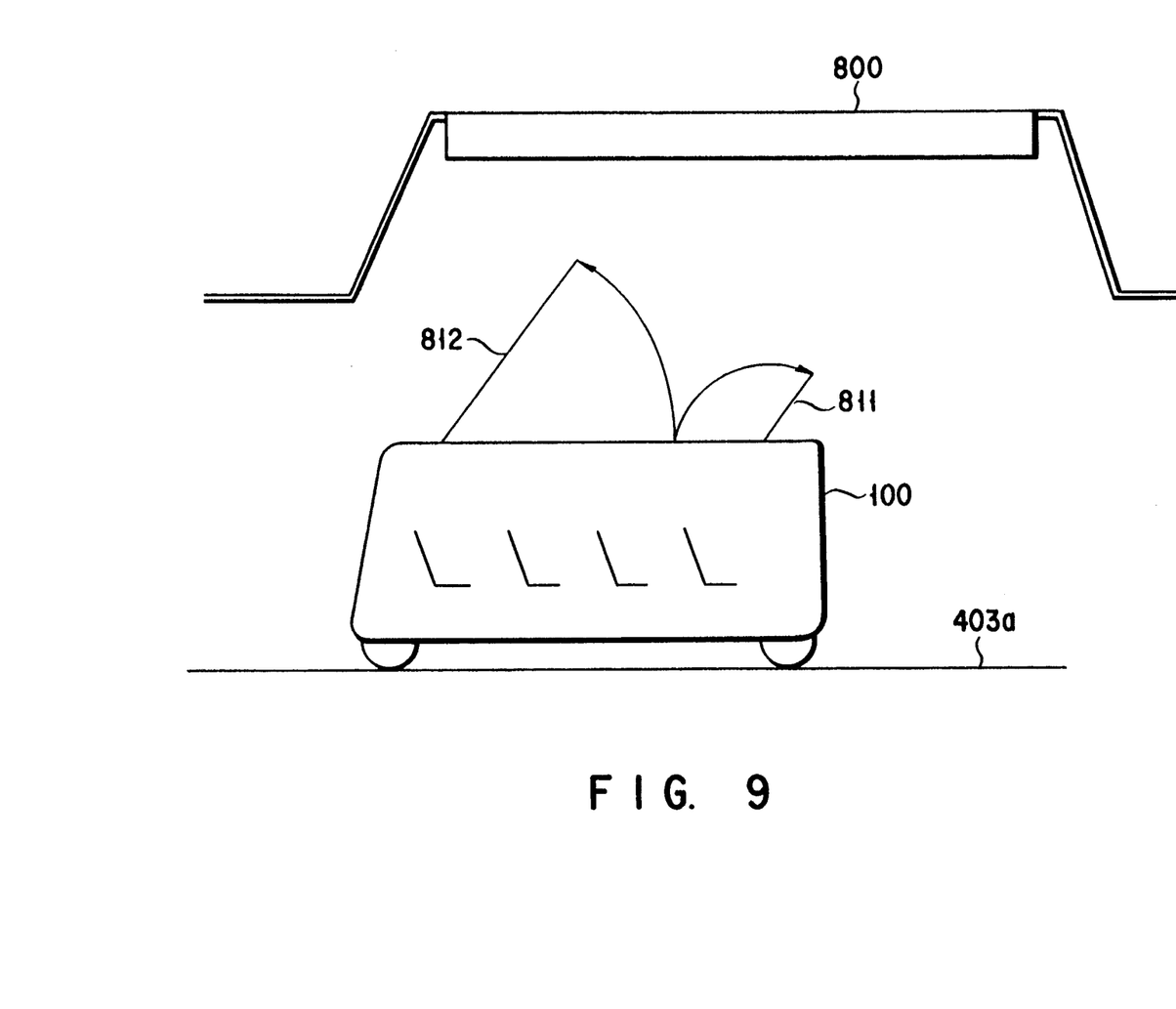
FIG. 9 shows an example of another sensation creation equipment provided midway along the guide path.

FIG. 9 shows a dome 800 situated midway along the guide path 403a. Equipment 801 such as shower equipment, air-feeding (cool air, warm air, etc. ) equipment, 3D display equipment, etc. is provided within the dome. When the ship 100 reaches the dome 800, openable roofs 811 and 812 of the ship 100 are opened in accordance with the contents of the displayed imagery (e.g. a scene of the deck of a ship in a storm), and real water drops enter the ship 100. When the displayed scene shows a sandstorm, a small amount of sand enter from the opened roofs. Although simplified in FIG. 9, the openable roofs 811 and 812 can be opened and closed in accordance with equipment control data programmed in accordance with the imagery contents of the image reproducing system 700. Further, the ship 100 is provided with a transmission system, and the various equipment in the dome can be remote-controlled. Further, it is possible to arrange models of planets in the dome and display 3D space imagery on the display equipment. It is also possible to emit fragrance in the dome and display imagery of flowers. For example, it is effective that an enlarged stereoscopic image of a flower is displayed so that the viewers feel as if they were bees.

As has been described above, various sensations can be created by providing various sensation equipment on different guide paths and selecting the guide path according to the imagery to be displayed. The present system can be used for creating various sensations.

The above-described apparatus may be mounted on a conventional roller coaster.

The stereoscopic imagery device will now be described.

Figure 10:
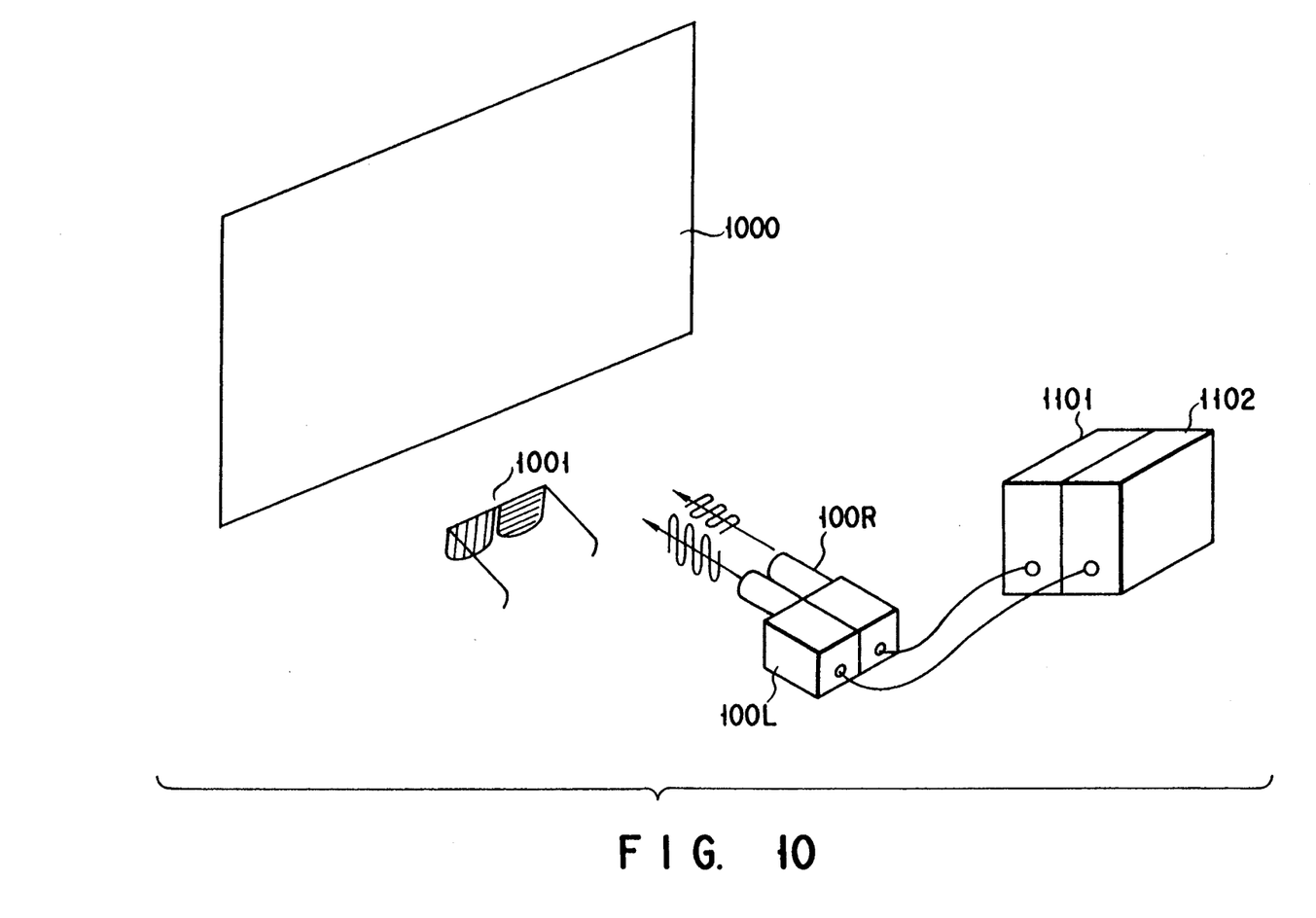
FIG. 10 is a view for explaining the principle of a stereoscopic imagery projection apparatus.

FIG. 10 illustrates the principle of the stereoscopic imagery apparatus. Two projectors 100R and 100L project right and left optical images on a screen 1000. The optical image projected from the projector 100R is horizontally polarized by a horizontal polarization filter, and the optical image projected from the projector 100L is vertically polarized by a vertical polarization filter. Accordingly, when the image on the screen 1000 is viewed through polarization spectacles 1100, a stereoscopic image is obtained. Right and left image signals are supplied from first and second image reproducing devices 1101 and 1102 to the projectors 100R and 100L. The projectors 100R and 100L convert the input image signals to optical images, e.g. through a liquid crystal display device. In FIG. 10, the projectors 100R and 100L are arranged in front of the screen 1000. However, in fact, the projectors are situated in rear of the screen 1000 within the ship, and the viewers see the images on the front side of the screen. Software used in the image reproducing devices 1101 and 1102 of the stereoscopic imagery device can be changed so that various stereoscopic imagery may be enjoyed. Information recording mediums used in the image reproducing devices 1101 and 1102 are magnetic tapes ( for video tape recorders), optical discs ( for disc reproducing apparatuses), etc.

As has been described above, according to the present system, even if one kind of hardware is used, various sensations can be created by using various software, and an effective sensation atmosphere can be created on the basis of visual and other senses, with a small space for installation and low costs. Since effective sensations can be created without moving the ship at high speed, the safety of the system is high.

What is claimed is:

1. A multisensation amusement apparatus for providing simulated multisensation environments comprising:
   a vehicle having a plurality of seats for passengers, multiple wheels which are extendable laterally and vertically from the vehicle, means for controlling the speed of rotation of the wheels and means for controlling lateral and vertical extension of the wheels;
   stereoscopic imagery protection means provided within the vehicle including a screen and means for projecting stereoscopic images on the screen;
   guide path means having a bottom wall and side walls on which the multiple wheels of the vehicle rest, said guide path means defining a path through which the vehicle travels and having multiple path segments connected together, including diverging path segments and converging path segments; and
   guide path selecting means for controlling the movement of the vehicle through the guide path means in accordance with contents of the stereoscopic imagery projected by the stereoscopic imagery projection means;
   wherein the stereoscopic imagery projection means incldues means for generating speed and attitude adjustment signals to alter the speed and attitude of the vehicle as the vehicle travels through the guide path means to simulate to passengers in the vehicle the visual and motion sensations of an environment.

2. The apparatus of claim 1, wherein the means for controlling the speed and the means for controlling the extension of the wheels are responsive to the speed and attitude adjustment signals output by said stereoscopic imagery means to control the speed of rotation of the wheels and the extension of the wheels against the bottom and side walls of the guide path means thereby changing the speed and attitude of the vehicle as it travels through the guide path means.

3. The apparatus according to claim 2, wherein the vehicle has an openable roof.

4. The apparatus according to claim 3, wherein said guide path means includes a segment having a dome through which the vehicle travels, the inside of the dome being provided with stereoscopic image reproducing means which can be viewed through the openable roof of the vehicle.

5. The apparatus according to claim 2, wherein said guide path means includes a segment having an enclosed water bath through which the vehicle travels.

6. The apparatus according to claim 2, wherein said means for controlling the extension of the wheels to swing the vehicle back and forth, or side to side, or back and forth and side to side.

7. The apparatus of claim 2, wherein the multiple wheels of the vehicle include side mounted wheels which ride on the side walls of the guide path means and bottom mounted wheels which ride on the bottom wall of the guide path means, and wherein the means for controlling the extension of the wheels comprises means for rapidly vibrating and reciprocating the side mounted and bottom mounted wheels in a predetermined manner to simulate a particular motion concurrently with images projected by the stereoscopic imagery projection means.

8. The apparatus of claim 2, wherein the guide path means comprises means for creating motion sensations in a vehicle as the vehicle travels therethrough.

9. The apparatus of claim 2, wherein the guide path means comprises a substantially closed loop and multiple diverging and converging segments interconnected in the loop.

10. The apparatus of claim 2, and further comprising multiple vehicles.

11. The apparatus of claim 2, wherein said guide path means comprises diverging switches and converging switches placed at the diverging path segments and converging path segments, respectively, and said vehicle comprising means for wirelessly transmitting control signals to the diverging switches and converging switches to control path travel through the guide path means.

* * * * *